US009576019B2

(12) United States Patent
Wang et al.

(10) Patent No.: US 9,576,019 B2
(45) **Date of Patent: *Feb. 21, 2017**

(54) INCREASING DISTRIBUTED DATABASE CAPACITY

(71) Applicant: Amazon Technologies, Inc., Reno, NV (US)

(72) Inventors: Weinan Wang, Bellevue, WA (US); Bruce K. Ferry, Seattle, WA (US); Aravanan Sivaloganathan, Seattle, WA (US); Zhiyu Zhang, Issaquah, WA (US); Min Zhu, Bellevue, WA (US); Jason Curtis Jenks, Lynnwood, WA (US); Aaron Drew Alexander Kujat, Issaquah, WA (US); Maxym Kharchenko, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 232 days.

This patent is subject to a terminal disclaimer.

(21) Appl. No.: 14/285,741

(22) Filed: May 23, 2014

(65) Prior Publication Data

US 2014/0258221 A1 Sep. 11, 2014

Related U.S. Application Data

(63) Continuation of application No. 13/246,437, filed on Sep. 27, 2011, now Pat. No. 8,738,624.

(51) Int. Cl.
*G06F 17/30* (2006.01)

(52) U.S. Cl.
CPC ... *G06F 17/30377* (2013.01); *G06F 17/30584* (2013.01)

(58) Field of Classification Search
USPC ........................................................ 707/737
See application file for complete search history.

(56) References Cited

U.S. PATENT DOCUMENTS

| | | | | |
|---|---|---|---|---|
| 5,497,483 | A | 3/1996 | Beardsley et al. | |
| 5,829,053 | A * | 10/1998 | Smith .................. | G06F 3/0607 711/114 |
| 6,601,084 | B1 | 7/2003 | Bhaskaran et al. | |
| 6,948,044 | B1 * | 9/2005 | Chandrasekaran ... | G06F 3/0605 370/252 |
| 7,120,651 | B2 | 10/2006 | Bamford et al. | |
| 7,296,125 | B2 | 11/2007 | Ohran | |
| 7,430,568 | B1 | 9/2008 | DeKoning et al. | |

(Continued)

OTHER PUBLICATIONS

U.S. Appl. No. 13/246,371 entitled "Facilitating Data Redistribution in Database Sharding," filed Sep. 27, 2011.

*Primary Examiner* — Cam-Linh Nguyen
(74) *Attorney, Agent, or Firm* — Thomas | Horstemeyer, LLP

(57) ABSTRACT

Disclosed are various embodiments for increasing distributed database capacity by adding new nodes while minimizing downtime. A database is partitioned among multiple nodes in a cluster. Each node stores a respective portion of the database. The portions of the database are replicated to corresponding physical standbys. For each portion, a first portion is mapped to an existing node, while a remaining portion is mapped to a physical standby. The cluster is updated to include the physical standbys as additional nodes among which the database is partitioned.

20 Claims, 11 Drawing Sheets

(56) References Cited

U.S. PATENT DOCUMENTS

| | | | |
|---|---|---|---|
| 7,434,093 | B2 | 10/2008 | Ohran |
| 7,685,109 | B1 | 3/2010 | Ransil et al. |
| 8,244,969 | B2 | 8/2012 | McWilliams et al. |
| 8,380,956 | B1 * | 2/2013 | Veprinsky ........... G06F 11/2069 711/154 |
| 8,392,482 | B1 | 3/2013 | McAlister et al. |
| 2003/0101321 | A1 | 5/2003 | Ohran |
| 2005/0193084 | A1 | 9/2005 | Todd et al. |
| 2006/0206662 | A1 * | 9/2006 | Ludwig ................. G06F 3/0607 711/114 |
| 2009/0276431 | A1 | 11/2009 | Lind et al. |
| 2010/0235606 | A1 | 9/2010 | Oreland et al. |
| 2010/0293140 | A1 * | 11/2010 | Nishiyama ........ G06F 17/30575 707/636 |
| 2011/0099147 | A1 | 4/2011 | McAlister et al. |
| 2011/0113184 | A1 | 5/2011 | Chu |
| 2011/0307447 | A1 | 12/2011 | Sabaa et al. |
| 2011/0307659 | A1 | 12/2011 | Hans et al. |
| 2012/0254175 | A1 | 10/2012 | Horowitz et al. |

* cited by examiner

INCREASING DISTRIBUTED DATABASE CAPACITY

CROSS-REFERENCE TO RELATED APPLICATIONS

This application is a continuation of, and claims priority to, co-pending U.S. patent application entitled "INCREASING DISTRIBUTED DATABASE CAPACITY" filed on Sep. 27, 2011 and assigned application Ser. No. 13/246,437, which is incorporated herein by reference in its entirety.

BACKGROUND

Databases may be distributed among multiple physical nodes. Sharding refers to the horizontal partitioning of a database among multiple physical data stores. In relational database management systems, data is organized into tables containing rows and columns. Each row corresponds to an instance of a data item, and each column corresponds to an attribute for the data item. Sharding produces partitions by rows instead of columns. Through partitioning, the data in a single table may be spread among potentially many different physical data stores, thereby improving scalability.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to scaling up capacity for a database that is capable of being distributed among multiple physical nodes in a cluster. A database may be distributed among multiple physical nodes, or data stores, for scalability. For example, database sharding may be employed so that the database is horizontally partitioned among multiple physical data stores. In database sharding, data items from a database may be organized into "buckets," which are then mapped to physical data stores. It may be desirable to add more physical data stores to the cluster to improve performance, increase service capacity, or for other reasons. However, it may be impractical to shut down the database cluster for an extended period of time to repartition the database and relocate data to new physical data stores.

Various embodiments of the present disclosure employ physical standbys to facilitate bringing additional cluster capacity online without an extended period of downtime. In one embodiment, a physical standby corresponds to a block-by-block copy of the portion of the database that is stored in a physical data store. The physical standby approach may be significantly faster than other approaches of copying, such as copying data from tables on a row-by-row basis. In addition, when operations are performed on the portion of the database during the copying, the operations may be replicated to the physical standby, thereby avoiding copying-caused downtime. Once the portions of the database are replicated, the database may be repartitioned or remapped so that buckets from the physical data store are evenly distributed among the physical data store and its mirrors. The mirrors are then brought online as independent nodes of the cluster. In the following discussion, a general description of the system and its components is provided, followed by a discussion of the operation of the same.

Figure 1:
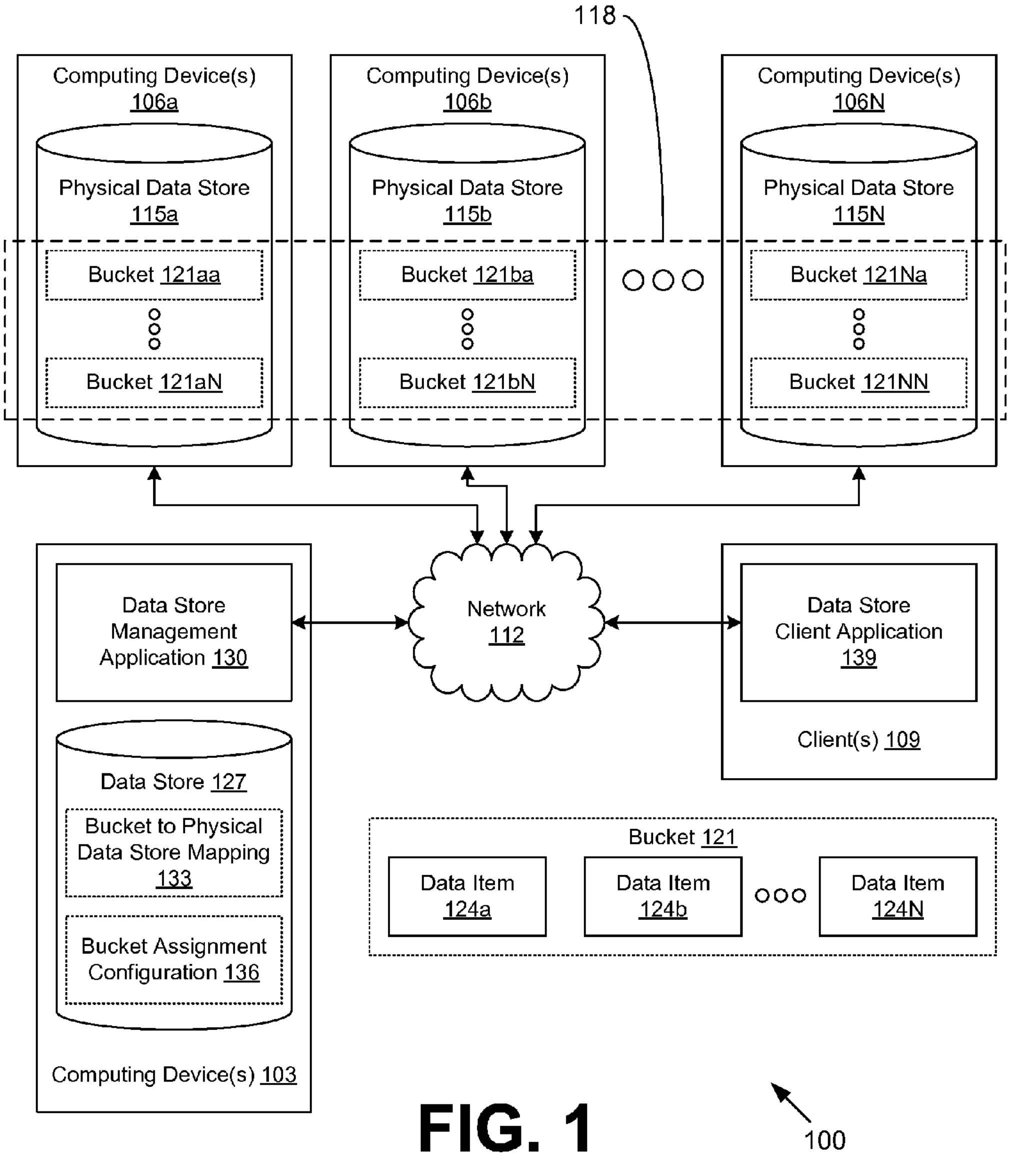
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with a plurality of computing devices 106*a*, 106*b* . . . 106N and one or more clients 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing devices 106 may each comprise, for example, a server computer or any other system providing computing capability. Alternatively, each of the computing devices 106 may represent a plurality of computing devices 106 that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, each computing device 106 is referred to herein in the singular. Even though each computing device 106 is referred to in the singular, it is understood that a plurality of computing devices 106 may be employed in the various arrangements as described above. Each of the computing devices 106 includes one or more data storage devices.

Each of the computing devices 106 includes a respective one of a plurality of physical data stores 115*a*, 115*b* . . . 115N. The physical data stores 115 collectively store a partitioned database 118. As such, the physical data stores 115 may be said to correspond to physical nodes of a distributed database cluster. The respective data from the database 118 that is stored by each one of the physical data stores 115 may be referred to as a partition. The partition may comprise a shard or horizontal partition. Such a partition corresponds to a plurality of buckets 121. In some embodiments, multiple physical data stores 115 may be hosted by one computing device 106. However, in other embodiments, the physical data stores 115 may be hosted by distinct computing devices 106 to improve performance and scalability. In some of these embodiments, a single physical data store 115 may be hosted by multiple computing devices 106 to further improve performance.

The buckets 121 stored by the physical data store 115*a* comprise a plurality of buckets 121*aa* . . . 121*a*N. The buckets 121 stored by the physical data store 115*b* comprise a plurality of buckets 121*ba* . . . 121*b*N. The buckets 121 stored by the physical data store 115N comprise a plurality of buckets 121Na . . . 121NN. Each bucket 121 corresponds to a respective grouping of a plurality of data items 124*a*, 124*b* . . . 124N from the database 118. With a database 118 that is a relational database, the data items 124 may correspond to rows from one or more tables. The data items 124 are assigned to particular buckets 121 using a modulus-based mapping to distribute the data items 124 evenly across the buckets 121. The buckets 121, in turn, are mapped to one of the physical data stores 115.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 127 that is accessible to the computing device 103. The data store 127 may be representative of a plurality of data stores 127 as can be appreciated. The data stored in the data store 127, for example, is associated with the operation of the various applications and/or functional entities described below.

The components executed on the computing device 103, for example, include a data store management application 130 and other applications, services, processes, systems, engines, or functionality not discussed in detail herein. The data store management application 130 is executed to maintain the database 118 stored in the physical data stores 115. To this end, the data store management application 130 is configured to store data items 124 in the database 118 and obtain data items 124 or portions thereof from the database 118. The data store management application 130 also may repartition the database 118 into buckets 121 and add or remove physical data stores 115 with redistribution of data from the database 118 as will be described.

The data stored in the data store 127 includes, for example, a bucket to physical data store mapping 133, a bucket assignment configuration 136, and potentially other data. The bucket to physical data store mapping 133 defines which buckets 121 are stored in which physical data stores 115. The bucket assignment configuration 136 controls assignment of data items 124 to buckets 121 by the data store management application 130. Additionally, the bucket assignment configuration 136 may be used to determine a bucket 121 to which a data item 124 has been assigned.

The client 109 is representative of a plurality of client devices that may be coupled to the network 112. The client 109 may comprise, for example, a processor-based system such as a computer system. Such a computer system may be embodied in the form of a desktop computer, a server computer, a laptop computer, personal digital assistants, cellular telephones, smartphones, set-top boxes, music players, web pads, tablet computer systems, game consoles, electronic book readers, or other devices with like capability. The client 109 may include a display comprising, for example, one or more devices such as cathode ray tubes (CRTs), liquid crystal display (LCD) screens, gas plasma-based flat panel displays, LCD projectors, or other types of display devices, etc.

The client 109 may be configured to execute various applications such as a data store client application 139 and/or other applications. The data store client application 139 is employed to access data items 124 or portions thereof which are stored in the database 118. The data store client application 139 may also issue repartitioning commands and store and/or update data items 124 stored in the database 118. The data store client application 139 may employ structured query language (SQL) and/or other interfaces. In some embodiments, the data store client application 139 may be executed in the computing device 103. The client 109 may be configured to execute applications beyond the data store client application 139 such as, for example, browser applications, mobile applications, email applications, instant message applications, and/or other applications.

Next, a general description of the operation of the various components of the networked environment 100 is provided. To begin, a database 118 is configured to use one or more physical data stores 115 to store data in a distributed data cluster. The database 118 is partitioned into buckets 121, with at least one bucket 121 being stored in each physical data store 115. In one example, the same number of buckets 121 are stored in each physical data store 115 to facilitate equal distribution of data items 124 to the physical data stores 115. In another example, a different number of buckets 121 may be stored in different ones of the physical data stores 115. The bucket to physical data store mapping 133 records which of the buckets 121 are stored in which of the physical data stores 115.

Data items 124 are assigned to buckets 121 through a procedure controlled by the bucket assignment configuration 136. For example, a key or other standardized portion of a data item 124 may be hashed, and the resulting hash value may be assigned to one of the buckets 121 using a modulo-based assignment. The modulo-based assignment may be stored in association with the data item 124 or determined dynamically in response to accessing the data item 124.

In one non-limiting example, the database 118 stores data relating to an electronic marketplace with multiple merchants. It may be desired that the data of each merchant be stored in one physical data store 115. Thus, the data items 124 stored by the merchant may include a merchant identifier. The bucket 121 assignment may be derived from the merchant identifier to ensure that data of the merchant is stored in one bucket 121 and one physical data store 115.

After the database 118 is initially configured, an increased number of buckets 121 may be desired for various reasons. For example, it may be easier to backup the database 118 if it is partitioned into a greater number of buckets 121 with each bucket 121 holding less data. To this end, the number of buckets 121 may be increased by some multiple of the number of buckets 121 so that each bucket 121 is divided into the same number of smaller buckets 121. The multiple may be selected in order to migrate buckets 121 to additional physical data stores 115.

Thus, the respective portion of the database 118 assigned to each set of L buckets 121 stored in a physical data store 115 may be reassigned to a respective set of M buckets, where L and M are positive integers and M is greater than L. Various approaches to increasing the number of buckets 121 are further described in U.S. patent application Ser. No.

13/246,371, entitled "FACILITATING DATA REDISTRIBUTION IN DATABASE SHARDING," and filed on Sep. 27, 2011, which is incorporated by reference herein in its entirety.

Additional physical data stores 115 may be brought online for the database 118 according to the following approach. One or more physical data stores 115 are established as physical standbys for each of the existing physical data stores 115. Physical standbys may correspond to block-by-block copies of their corresponding physical data store 115. A physical standby may be created while its corresponding physical data store 115 remains in operation. The update of a physical standby may be an ongoing process, and a physical standby may need to be updated if the corresponding portion of the database 118 is modified during the creation of the physical standby. Therefore, write operations through the data store management application 130 may be temporarily disabled to allow the physical standbys to be up to date as part of the procedure of bringing them online as additional physical data stores 115 in the cluster. In one embodiment, an increase in the number of buckets 121 is performed in response to creating the physical standbys.

The bucket to physical data store mapping 133 is updated so that the buckets 121 on a physical data store 115 are evenly divided among the physical data store 115 and its corresponding physical standbys. Accordingly, if a set of M buckets is stored in each physical data store 115, a distinct subset of M buckets 121 remain stored in the physical data store 115 while a respective distinct subset of M buckets 121 may be stored by each one of the set of N physical data stores 115 which were physical standbys of the physical data store 115. M and N may be positive integers. In one embodiment, each of the distinct subsets of the respective set of M buckets 121 may contain M divided by (N+1) of the respective set of M buckets 121, where M divided by (N+1) is a positive integer. In one embodiment, the data store management application 130 may be configured to determine a value for M based at least in part on a value for N and a value for a former number of buckets 121 into which each physical data store 115 of the database 118 was partitioned. The former physical standbys are thus promoted to independent physical nodes of the database cluster. Write operations may then be re-enabled. The data stored in a physical data store 115 that is unmapped in the bucket to physical data store mapping 133 may be purged.

Figure 2A:
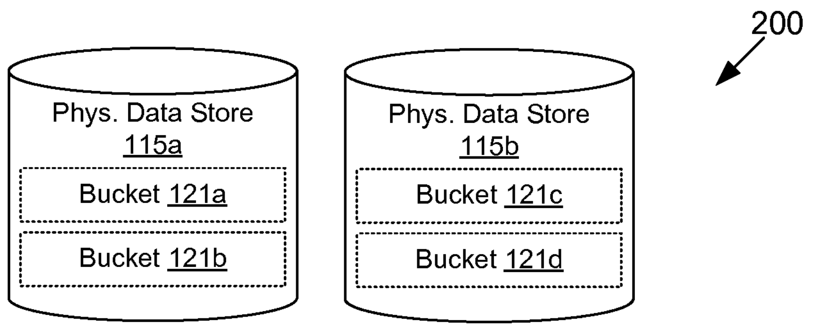
FIGS. 2A-2H are drawings depicting various stages of data redistribution among physical data stores in the networked environment of FIG. 1 according to various embodiments of the present disclosure.
Figure 2B:
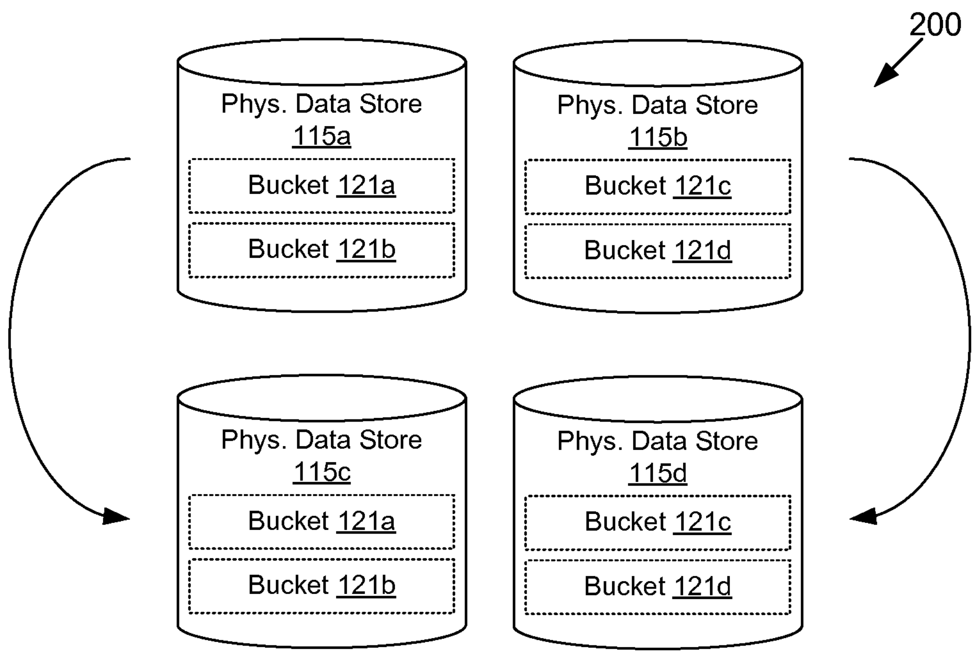
Figure 2C:
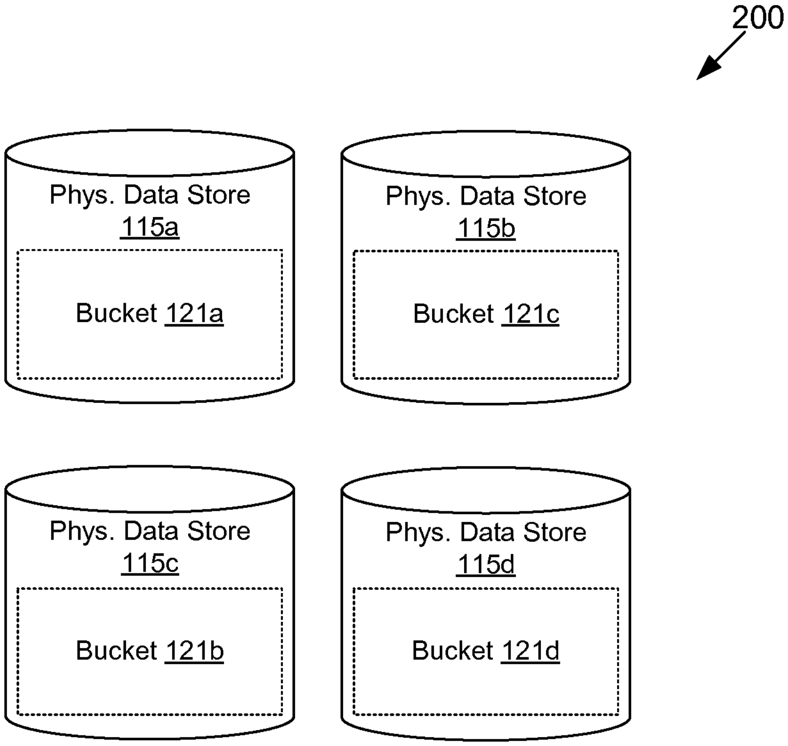

Turning now to FIGS. 2A-2H, shown are drawings depicting various stages of data redistribution among a plurality of physical data stores 115 in the networked environment 100 (FIG. 1) according to various embodiments. FIGS. 2A-2C relate to a first non-limiting example. FIG. 2A shows a database cluster 200 with two physical data stores 115*a* and 115*b* which are used to store data items 124 (FIG. 1) from a database 118 (FIG. 1). The physical data store 115*a* is mapped to two buckets 121*a* and 121*b*. The physical data store 115*b* is also mapped to two buckets 121*c* and 121*d*. It is noted that each physical data store 115 is mapped to an equal number of buckets 121 to provide for an equal distribution of data assignments across the physical data stores 115. At the least, each physical data store 115 will have one bucket 121, but a physical data store 115 may store many buckets 121 in some cases.

FIG. 2B illustrates the replication of the physical data stores 115*a* and 115*b* to two physical standbys. Specifically, the portion of the database 118 (FIG. 1) which is stored in the physical data store 115*a* is replicated to the physical data store 115*c*. Thus, physical data store 115*c* also stores the two buckets 121*a* and 121*b* from the physical data store 115*a*. Likewise, the portion of the database 118 which is stored in the physical data store 115*b* is replicated to the physical data store 115*d*. Accordingly, the physical data store 115*d* also stores the two buckets 121*c* and 121*d* from the physical data store 115*b*. Although the physical data stores 115*a* and 115*b* are depicted as being replicated to one physical standby each, it is noted that they may be replicated to N physical standbys each, where N is one or greater.

FIG. 2C shows the state of the database cluster 200 after the data migration is complete. The physical data store 115*a* stores only the bucket 121*a*, with the bucket 121*b* (FIG. 2B) having been purged. The physical data store 115*c*, a former physical standby, stores only the bucket 121*b*, with the copy of bucket 121*a* (FIG. 2B) having been purged. The physical data store 115*b* stores only the bucket 121*c*, with the bucket 121*d* (FIG. 2B) having been purged. The physical data store 115*d*, a former physical standby, stores only the bucket 121*d*, with the copy of bucket 121*c* (FIG. 2B) having been purged. The physical data stores 115*c* and 115*d* are fully integrated into the database cluster 200 as independent physical nodes storing their own respective portions of the database 118 (FIG. 1).

Figure 2D:
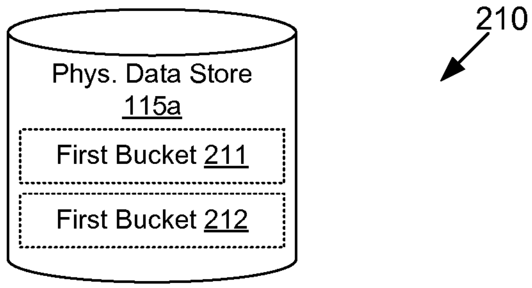
Figure 2E:
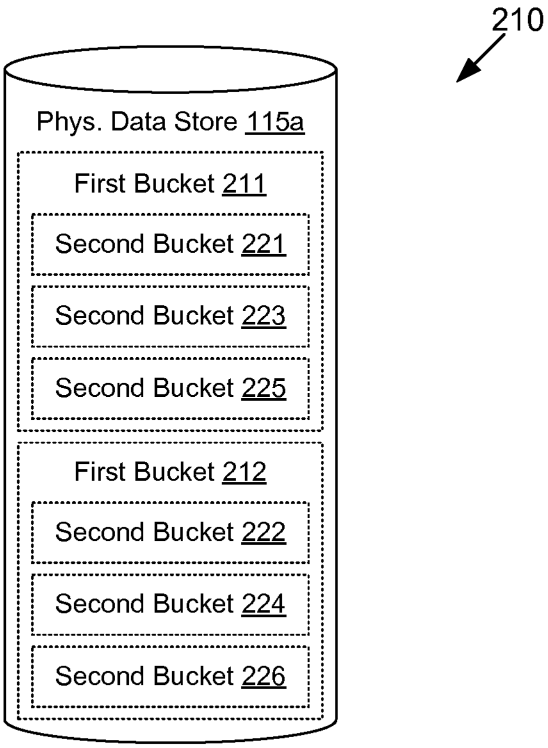

Continuing on, FIGS. 2D-2H depict another example of data migration in a database cluster 210 which involves the repartitioning of buckets 121 (FIG. 1). FIG. 2D illustrates a database cluster 210 having one physical data store 115*a* which stores first buckets 211 and 212. FIG. 2E illustrates a repartitioning of the physical data store 115*a* to increase the number of buckets 121 (FIG. 1). The buckets 121 according to the previous configuration are referred to as first buckets 121, while the buckets 121 according to the new configuration are referred to second buckets 121. In the non-limiting example of FIG. 2E, each first bucket 121 is divided into three second buckets 121. In the physical data store 115*a*, the first bucket 211 is divided into second buckets 221, 223, and 225, and the first bucket 212 is divided into second buckets 222, 224, and 226.

It is noted that each one of the first buckets 211 and 212 is divided into the same number of second buckets 121. The total number of second buckets 121 may be selected, for example, to be a multiple of a new number of physical data stores 115. Also, in this non-limiting example, the identifier for each second bucket 121 may be derived from the identifier for the respective first bucket 121.

To illustrate, the first bucket 212 may have an identifier i1 of "2." The identifiers i2 of the second buckets 222, 224, and 226 may be determined according to the equation: $i2=i1+k*n$, where k is the number of first buckets 121 (a total quantity of first buckets 121 in all of the sets of P first buckets 121, P being a positive integer) and n is a non-negative integer less than the number of second buckets 121 divided by k. Alternatively, n may be described as a non-negative integer less than Q, where Q is a positive integer and a multiple of P, and Q corresponds to the number of second buckets 121 in each set of second buckets 121. Here, k equals 2, the number of second buckets 121 equals 6, and n equals the set of {0, 1, 2}. Therefore, the set of i2 is {2, 4, 6}, which corresponds to the identifiers for second buckets 222, 224, and 226. It is noted that the reference numerals for the second buckets 121 are intentionally selected to be 220 plus the identifier described above, to fit with this example.

Figure 2F:
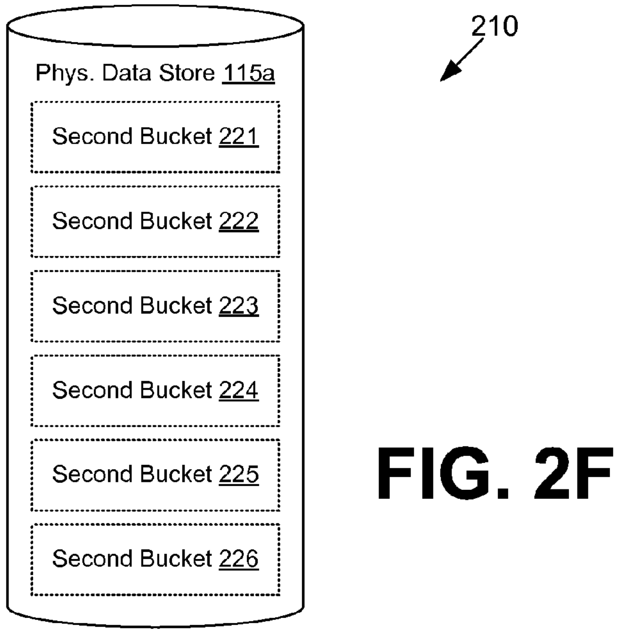
Figure 2G:
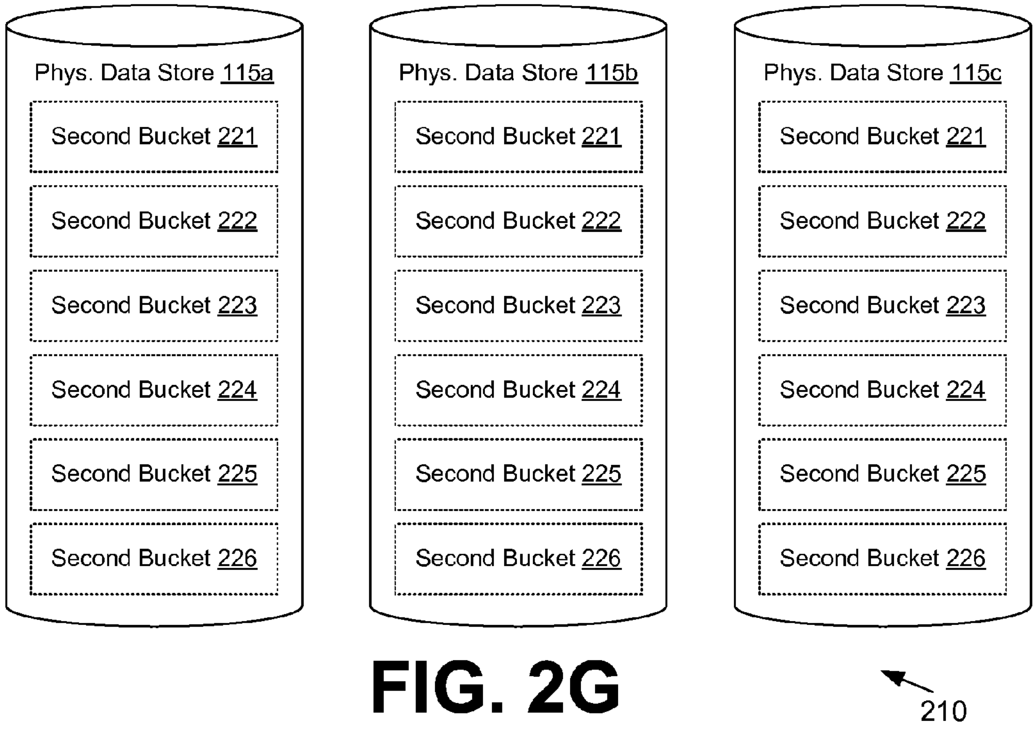

FIG. 2F illustrates the result of the repartitioning of FIG. 2D. The physical data store 115*a* stores the second buckets 221, 222, 223, 224, 225, and 226. FIG. 2G depicts the addition of two new physical data stores 115*b* and 115*c* as physical standbys for the physical data store 115*a*. As physical standbys, the physical data stores 115*b* and 115*c* store a block-by-block replication of the data items 124 (FIG. 1) stored in the second buckets 221, 222, 223, 224, 225, and 226.

Figure 2H:
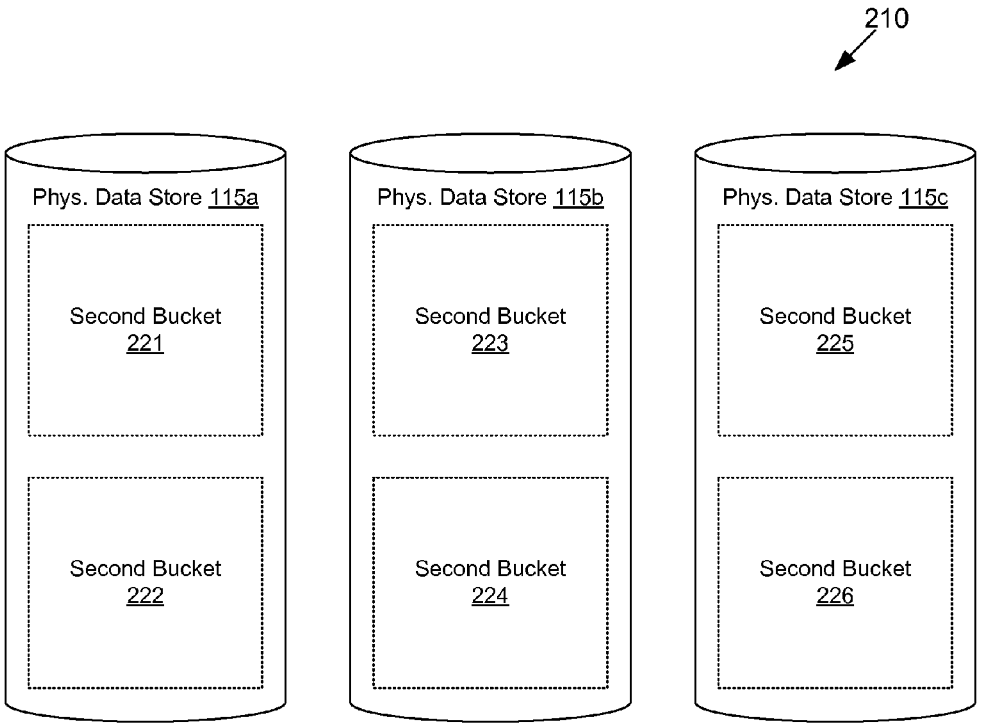

FIG. 2H shows the state of the database cluster 210 after the physical data stores 115*b* and 115*c* are integrated as independent physical nodes. Rather than each storing a copy of all of the second buckets 221, 222, 223, 224, 225, and 226, the physical data store 115*a* now stores only the second buckets 221 and 222, the physical data store 115*b* now stores only the second buckets 223 and 224, and the physical data store 115*c* now stores only the second buckets 225 and 226. The database cluster 210 is now three times as large compared with the initial depiction in FIG. 2D with just one physical data store 115*a*.

Figure 3A:
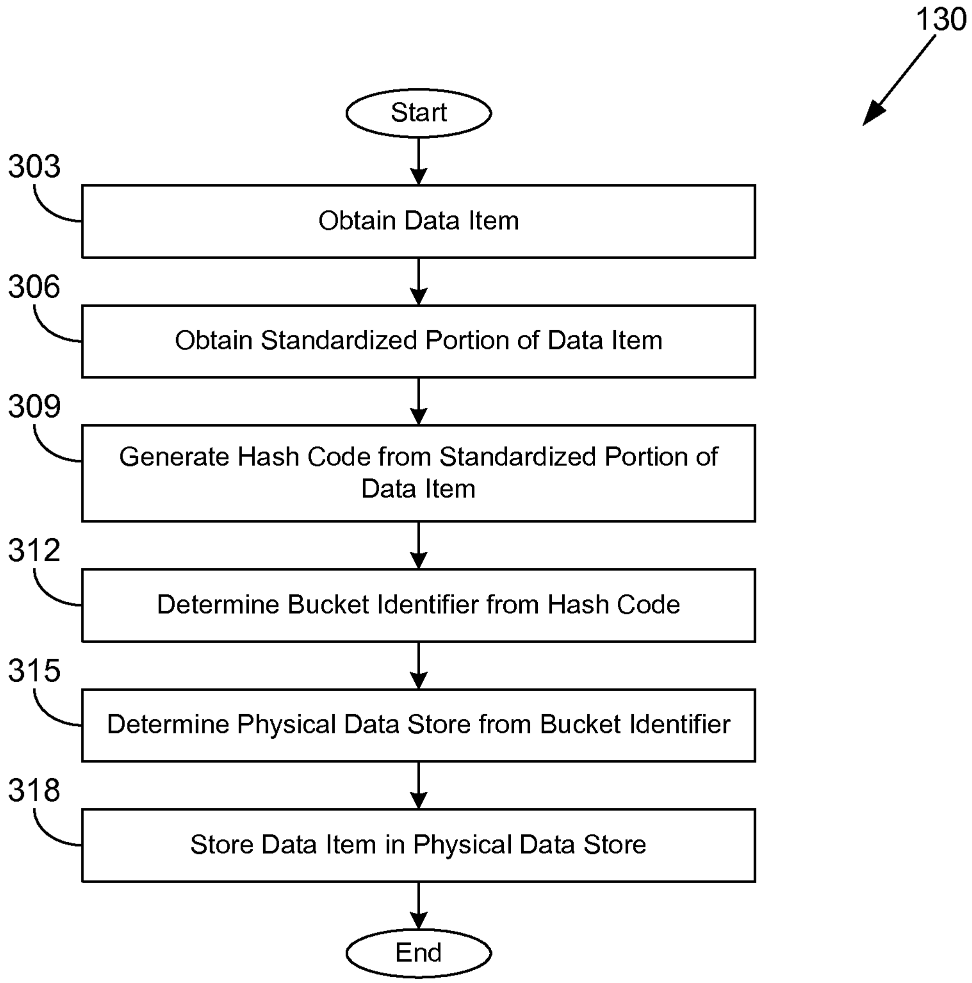
FIGS. 3A-3D are flowcharts illustrating examples of functionality implemented as portions of a data store management application executed in a computing device in the networked environment of FIG. 1 according to various embodiments of the present disclosure.

Referring next to FIG. 3A, shown is a flowchart that provides one example of the operation of a portion of the data store management application 130 according to various embodiments. In particular, the flowchart of FIG. 3A relates to storage of a data item 124 (FIG. 1) in the database 118 (FIG. 1). It is understood that the flowchart of FIG. 3A provides merely an example of the many different types of functional arrangements that may be employed to implement the operation of the portion of the data store management application 130 as described herein. As an alternative, the flowchart of FIG. 3A may be viewed as depicting an example of steps of a method implemented in the computing device 103 (FIG. 1) according to one or more embodiments.

Beginning with box 303, the data store management application 130 obtains a data item 124. For example, the data item 124 may be supplied by a data store client application 139 (FIG. 1) as part of an SQL insert or update statement. In box 306, the data store management application 130 obtains a standardized portion of the data item 124. The standardized portion may correspond, for example, to a primary key or a portion thereof. In box 309, the data store management application 130 generates a hash code by applying a hash function to the standardized portion of the data item 124.

In box 312, the data store management application 130 determines a bucket identifier from the hash code. The bucket identifier uniquely identifies a bucket 121 (FIG. 1). In one embodiment, the data store management application 130 applies the modulus operation to the hash code, which is used as the dividend, and to the number of buckets, which is used as the divisor. The result of the modulus operation may be used directly as the bucket identifier or may be transformed in some way to arrive at the bucket identifier. In another embodiment, the bucket identifier may be determined according to a mapping of data items 124 to buckets 121. The determination of the bucket identifier may be controlled in part by settings in the bucket assignment configuration 136 (FIG. 1).

In box 315, the data store management application 130 determines a physical data store 115 (FIG. 1) from the bucket identifier. To this end, the data store management application 130 may consult the bucket to physical data store mapping 133 (FIG. 1). In box 318, the data store management application 130 stores, or updates, the data item 124 in the physical data store 115 determined in box 315. In one embodiment, the data store management application 130 may store the bucket identifier along with the data item 124. Thereafter, the portion of the data store management application 130 ends.

Figure 3B:
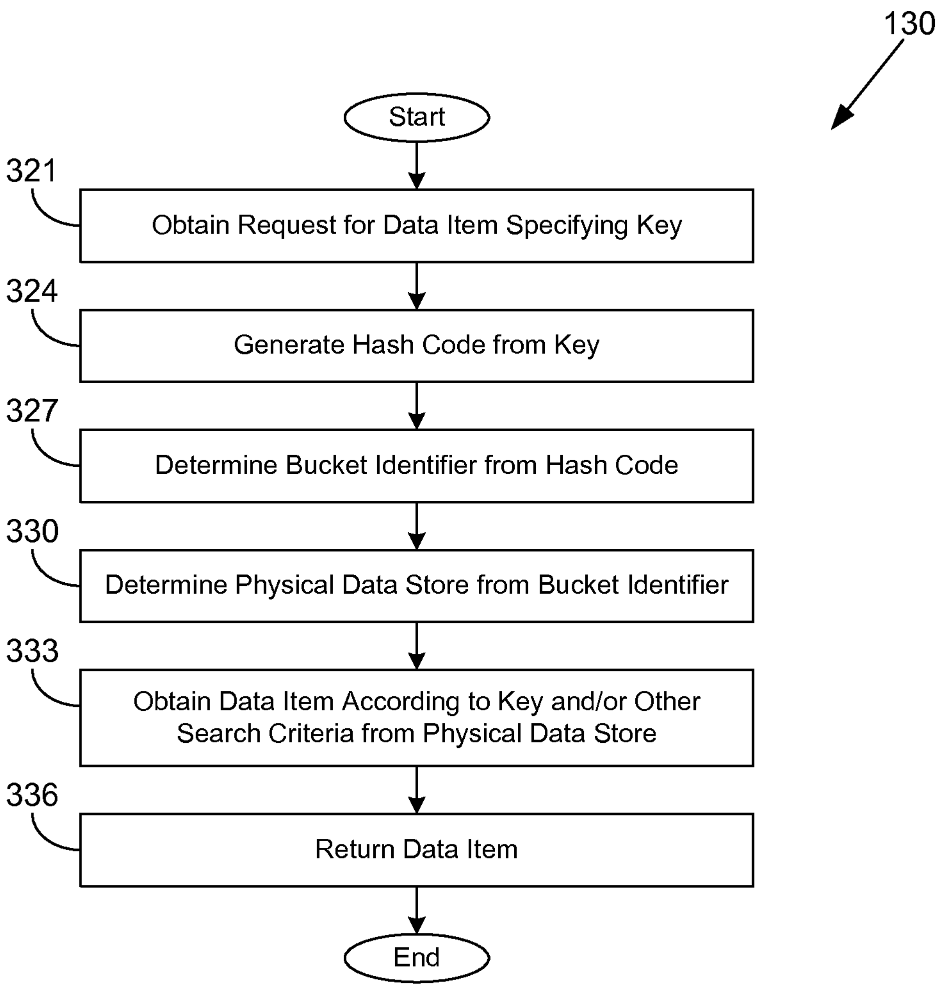

Turning now to FIG. 3B, shown is a flowchart that provides one example of the operation of another portion of the data store management application 130 according to various embodiments. Specifically, the flowchart of FIG. 3B relates to obtaining a data item 124 (FIG. 1) from a database 118 (FIG. 1). It is understood that the flowchart of FIG. 3B provides merely an example of the many different types of functional arrangements that may be employed to implement the operation of the other portion of the data store management application 130 as described herein. As an alternative, the flowchart of FIG. 3B may be viewed as depicting an example of steps of a method implemented in the computing device 103 (FIG. 1) according to one or more embodiments.

Beginning with box 321, the data store management application 130 obtains a request for a data item 124, where the request specifies a key that identifies the data item 124. For example, the request may be obtained from a data store client application 139 (FIG. 1) and may correspond to a select SQL statement. In box 324, the data store management application 130 generates a hash code by applying a hash function to the key or a portion of the key.

In box 327, the data store management application 130 determines a bucket identifier from the hash code. In one embodiment, the data store management application 130 may apply a modulus operation to determine the bucket identifier, i.e., the bucket identifier equals the hash code modulo the number of buckets 121 (FIG. 1). The result of the modulus operation may be transformed in some way to arrive at the bucket identifier. The determination of the bucket identifier from the key may be controlled at least in part by stored settings in the bucket assignment configuration 136 (FIG. 1).

In box 330, the data store management application 130 determines a physical data store 115 (FIG. 1) from the bucket identifier according to the bucket to physical data store mapping 133 (FIG. 1). In box 333, the data store management application 130 obtains the data item 124 according to the key and/or other search criteria from the physical data store 115 determined in box 330. In box 336, the data store management application 130 returns the data item 124. Thereafter, the portion of the data store management application 130 ends.

Figure 3C:
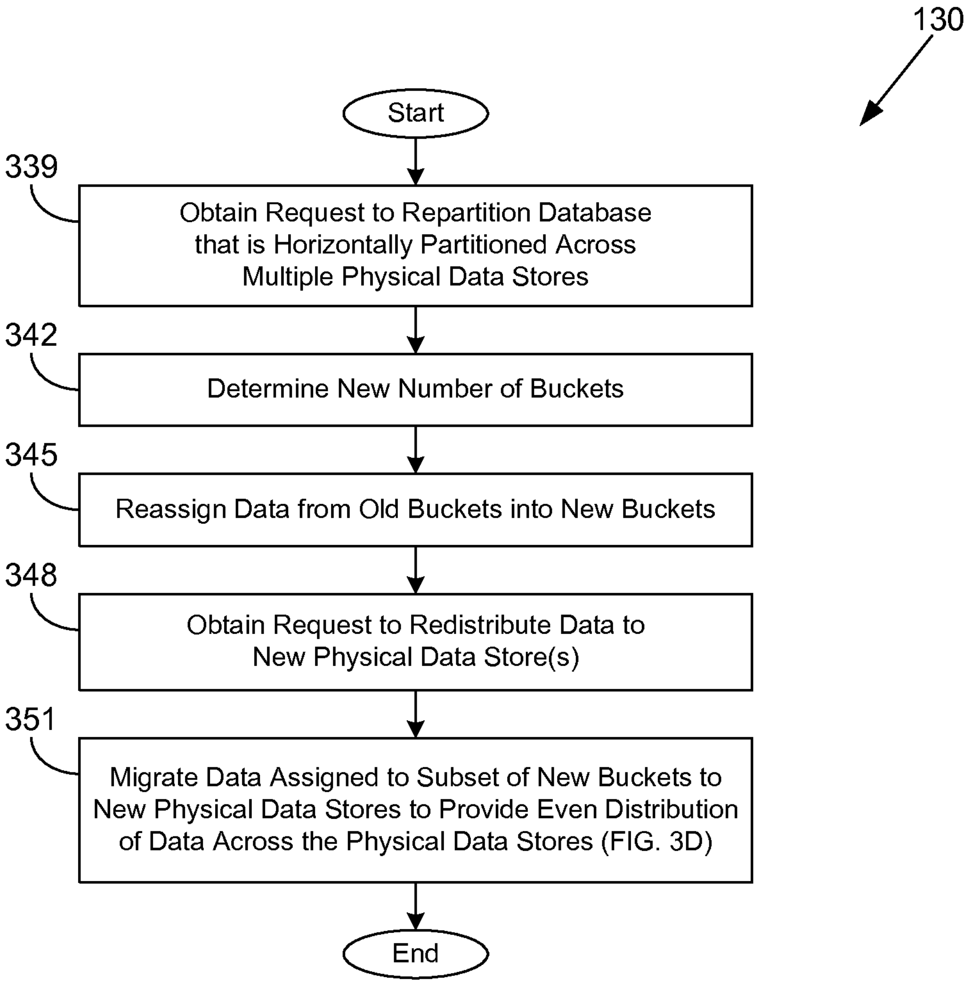

Moving on to FIG. 3C, shown is a flowchart that provides one example of the operation of yet another portion of the data store management application 130 according to various embodiments. In particular, the flowchart of FIG. 3C relates to the redistribution of data items 124 (FIG. 1) in the database 118 (FIG. 1) considering the addition of one or more new physical data stores 115 (FIG. 1). It is understood that the flowchart of FIG. 3C provides merely an example of the many different types of functional arrangements that may be employed to implement the operation of the other portion of the data store management application 130 as described herein. As an alternative, the flowchart of FIG. 3C may be viewed as depicting an example of steps of a method implemented in the computing device 103 (FIG. 1) according to one or more embodiments.

Beginning with box 339, the data store management application 130 obtains a request to repartition a database 118 that is partitioned across multiple physical data stores 115. For example, the request may be obtained from the data store client application 139 (FIG. 1). In box 342, the data store management application 130 determines a new number of buckets 121 (FIG. 1).

In one example, the new number of buckets 121 may be selected to be a multiple of the existing number of buckets 121 and of a new number of physical data stores 115. In another example, the new number of buckets 121 may be selected to be a multiple of the existing number of buckets 121 plus a positive integer. In yet another example, the new number of buckets 121 may be selected to be a multiple of the sum of a positive integer and the previous quantity of the physical data stores 115.

Once the new number of buckets 121 is determined, the data store management application 130 reassigns data items 124 from the old bucketing arrangement to the new bucketing arrangement in box 345. In this reassignment, the data items 124 remain unmoved among the physical data stores 115. In one embodiment, new bucket identifiers may be stored along with the data items 124 in the database 118. In another embodiment, the bucket assignment configuration 136 (FIG. 1) is updated so that dynamically generated bucket identifiers correspond to the new bucket identifiers.

In box 348, the data store management application 130 obtains a request to redistribute data items 124 to newly added physical data stores 115. Such a request may automatically follow the bucket 121 reassignment or may be manually generated by a data store client application 139 (FIG. 1). In box 351, the data store management application 130 migrates data items 124 that are assigned to a subset of the new buckets 121 to the new physical data stores 115. An example of the migration will be further described in connection with the flowchart of FIG. 3D. The quantity of the buckets 121 moved to each new physical data store corresponds to the number of buckets 121 divided by the total number of physical data stores 115. The migration provides for an even distribution of the data items 124 across the physical data stores 115. Thereafter, the portion of the data store management application 130 ends.

Figure 3D:
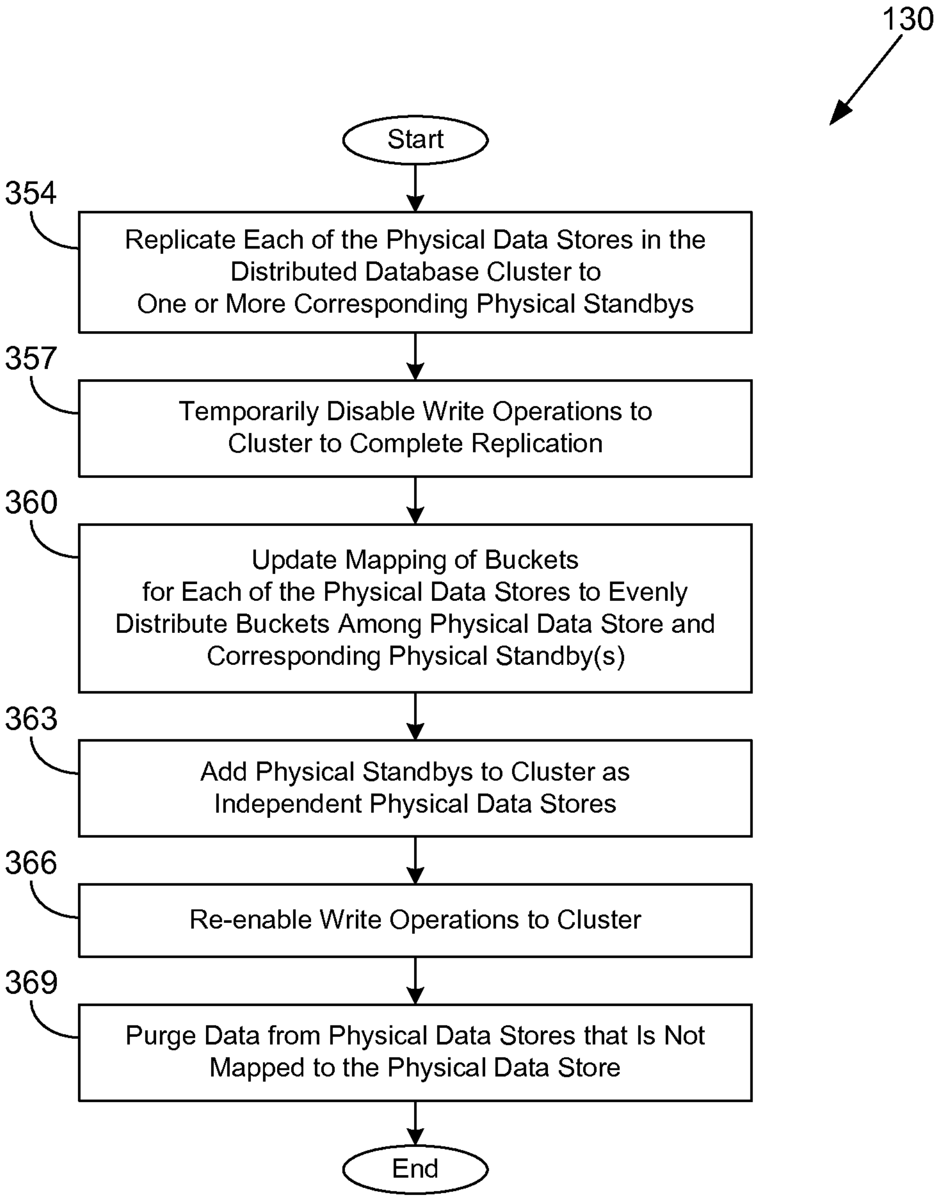

Turning now to FIG. 3D, shown is a flowchart that provides one example of the operation of yet another portion of the data store management application 130 according to various embodiments. In particular, the flowchart of FIG. 3D relates to the migration of data items 124 (FIG. 1) in the database 118 (FIG. 1) to one or more new physical data stores 115 (FIG. 1). It is understood that the flowchart of FIG. 3D provides merely an example of the many different types of functional arrangements that may be employed to implement the operation of the other portion of the data store management application 130 as described herein. As an alternative, the flowchart of FIG. 3D may be viewed as depicting an example of steps of a method implemented in the computing device 103 (FIG. 1) according to one or more embodiments.

Beginning with box 354, the data store management application 130 initiates replication of each of the physical data stores 115 in a distributed database cluster to one or more corresponding physical standbys. Each physical standby corresponds to a block-by-block copy of the portion of the database 118 that is stored by the respective physical data store 115. It is noted that a physical data store 115 may be replicated to one physical standby or more than one physical standby. However, for an even distribution of data, it is contemplated that each physical data store 115 is replicated to the same number of physical standbys if the database 118 is initially balanced among the physical data stores 115. If the database 118 is not initially balanced among the physical data stores 115, various ones of the physical data stores 115 may be replicated to different numbers of physical standbys. Further, one or more physical data stores 115 may be not replicated at all in an initially unbalanced scenario. After replication is initiated, the replication process may occur in the background without downtime, with the physical standbys continuing to catch up with the physical data stores 115.

In box 357, the data store management application 130 temporarily disables write operations to the physical data stores 115 in the cluster in order to complete replication. Although this may result in some downtime, the downtime is minimized in comparison with an approach that would take the cluster offline to perform the copying. In addition, block-by-block copying is significantly faster than row-by-row copying of particular data items 124. (FIG. 1).

In box 360, the data store management application 130 updates the bucket to physical data store mapping 133 (FIG. 1) so that the buckets 121 (FIG. 1) formerly mapped to a physical data store 115 are now evenly distributed among the physical data store 115 and its physical standbys. As a non-limiting example, if each physical data store 115 is mapped to six buckets 121 of a database 118, and if the physical data store 115 is replicated to two physical standbys, each of the physical data store 115 and the two physical standbys will be mapped to two distinct buckets 121 from the six in response to box 360.

In box 363, the data store management application 130 adds the former physical standbys to the distributed database cluster as independent physical data stores 115. In box 366, the data store management application 130 re-enables write operations to the distributed database cluster. In box 369, the data store management application 130 purges data from the physical data stores 115 that is not mapped to the respective physical data store 115. For example, if a portion of data is divided among three physical data stores 115 using this approach, only a third of the data remains mapped to the respective one of the three physical data stores 115. The remaining two-thirds portion is no longer mapped in the cluster and may be purged. Thereafter, the portion of the data store management application 130 ends.

It is noted that the flowchart of FIG. 3D may assume that the existing number of buckets 121 initially stored by each of the physical data stores 115 is evenly divisible by the number of physical standbys onto which the physical data store 115 is replicated plus one. If the number of buckets 121 is not evenly divisible, the database 118 may be repartitioned by the data store management application 130 as described, for example, in connection with the flowchart of FIG. 3C to increase the number of buckets 121. This repartitioning may occur, for example, in connection with the tasks of box 360, before the tasks of box 354 are performed, or at another time.

Figure 4:
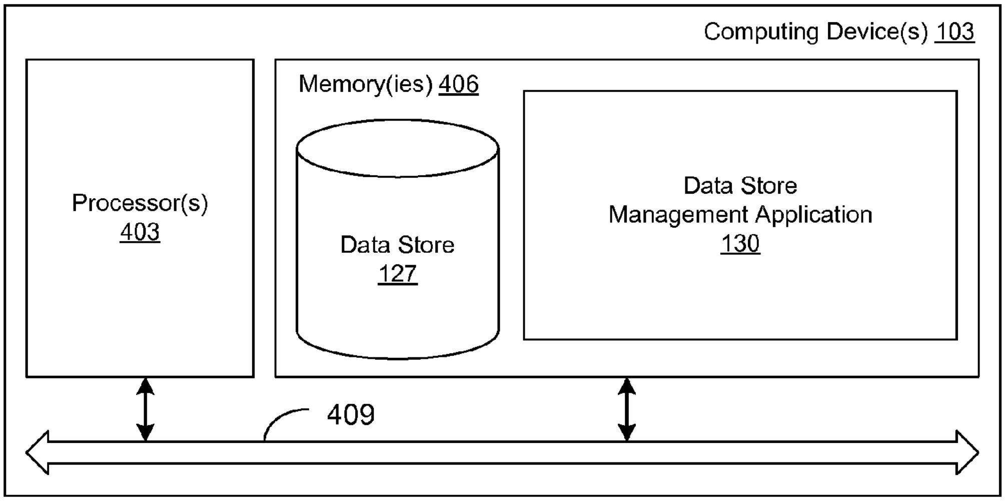
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the data store management application 130 and potentially other applications. Also stored in the memory 406 may be a data store 127 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although data store management application 130, the data store client application 139 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3A-3C show the functionality and operation of an implementation of portions of the data store management application 130. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3A-3C show a specific order of execution, it is understood that the order of execution may differ from that which is depicted. For example, the order of execution of two or more blocks may be scrambled relative to the order shown. Also, two or more blocks shown in succession in FIGS. 3A-3C may be executed concurrently or with partial concurrence. Further, in some embodiments, one or more of the blocks shown in 3A-3C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data store management application 130 and the data store client application 139, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:

initiate replication of a database stored by and partitioned among a plurality of physical data stores to a corresponding plurality of physical standbys, wherein individual ones of the plurality of physical data stores store respective ones of a plurality of portions of the database; and partition a particular portion of the plurality of portions of the database after replication such that:

a first portion of the particular portion is mapped to a particular physical data store of the plurality of physical data stores, and a remaining portion of the particular portion is mapped to a particular physical standby of the corresponding plurality of physical standbys.

2. The non-transitory computer-readable medium of claim 1, wherein the database is horizontally partitioned.

3. The non-transitory computer-readable medium of claim 1, wherein when executed the program further causes the at least one computing device to initiate purging of an unmapped portion of the database after partitioning the particular portion.

4. The non-transitory computer-readable medium of claim 1, wherein when executed the program further causes the at least one computing device to at least temporarily disable write access to the database relative to initiating replication.

5. The non-transitory computer-readable medium of claim 1, wherein upon replication, the corresponding plurality of physical standbys are block-by-block copies of the respective ones of the plurality of portions of the database.

6. A system, comprising:

at least one computing device; and at least one application executable in the at least one computing device, wherein when executed the at least one application causes the at least one computing device to at least:

initiate replication of a database stored by and partitioned among a plurality of physical data stores in a cluster to a corresponding plurality of physical standbys, wherein individual ones of the plurality of physical data stores store respective ones of a plurality of portions of the database; and map a first portion of a particular portion of the plurality of portions of the database to a particular physical data store of the plurality of physical data stores, and maps a remaining portion of the particular portion to a particular physical standby of the corresponding plurality of physical standbys.

7. The system of claim 6, wherein when executed the at least one application further causes the at least one computing device to at least update the cluster to include the corresponding plurality of physical standbys as additional physical data stores among which the database is partitioned.

8. The system of claim 6, wherein when executed the at least one application further causes the at least one computing device to at least initiate purging of an unmapped portion of the database after mapping.

9. The system of claim 6, wherein when executed the at least one application further causes the at least one computing device to at least temporarily disable write access to the database relative to initiating replication.

10. The system of claim 6, wherein when executed the at least one application further causes the at least one computing device to at least:

reassign, for individual ones of the plurality of physical data stores, a respective one of the plurality of portions of the database from a respective set of P first buckets to a respective set of Q second buckets; and wherein P and Q are positive integers, and Q is a multiple of P.

11. The system of claim 10, wherein the reassigning employs modulo-based assignments.

12. The system of claim 10, wherein the reassigning is performed in response to the replication of the database.

13. A method, comprising:

creating, via at least one of one or more computing devices, a corresponding second set of physical data stores for individual ones of a first set of physical data stores, wherein a database is partitioned among the first set of physical data stores, the individual ones of the first set of data stores storing a respective portion of the database that is divided into a respective set of buckets, individual ones of the corresponding second set of physical data stores mirroring the respective portion of the database stored by a corresponding one of the first set of physical data stores; and updating, via at least one of the one or more computing devices, a bucket mapping to designate, for the individual ones of the first set of physical data stores:

a distinct subset of the respective set of buckets is stored by the individual ones of the first set of physical data stores; and a respective distinct subset of the respective set of buckets is stored by individual ones of the corresponding second set of physical data stores.

14. The method of claim 13, further comprising initiating, via at least one of the one or more computing devices, purging of the respective portion of the database from the individual ones of the first set of physical data stores other than a particular portion of the respective portion of the database that corresponds to the distinct subset of the respective set of buckets.

15. The method of claim 13, further comprising initiating, via at least one of the one or more computing devices, purging of the respective portion of the database from the individual ones of the corresponding second set of physical data stores other than a portion of the respective portion of the database that corresponds to the respective distinct subset of the respective set of buckets.

16. The method of claim 13, further comprising temporarily disabling, via at least one of the one or more computing devices, write access to the database relative to creating the corresponding second set of physical data stores.

17. The method of claim 13, wherein the individual ones of the corresponding second set of physical data stores are identical physical standbys of the corresponding one of the first set of physical data stores.

18. The method of claim 17, wherein the identical physical standbys are block-by-block copies of the respective portion of the database.

19. The method of claim 13, wherein the first set of physical data stores comprises a horizontally partitioned database cluster, and the method further comprises adding, via at least one of the one or more computing devices, the corresponding second set of physical data stores to the horizontally partitioned database cluster upon updating the bucket mapping.

20. The method of claim 13, wherein the respective set of buckets consists of M buckets, M is a positive integer greater than 1, the corresponding second set of physical data stores consists of N physical data stores, N is a positive integer that is greater than 1, individual ones of the distinct subsets of the respective set of buckets contain M divided by (N+1) buckets of the respective set of buckets, and M divided by (N+1) is a positive integer.

* * * * *